(12) United States Patent
Dinh et al.

(10) Patent No.: US 7,619,162 B2
(45) Date of Patent: Nov. 17, 2009

(54) DUAL-HINGE RECESSED OUTDOOR BOX AND COVER

(75) Inventors: Cong Thanh Dinh, Collierville, TN (US); Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 255 days.

(21) Appl. No.: 11/810,110

(22) Filed: Jun. 4, 2007

(65) Prior Publication Data

US 2008/0296039 A1 Dec. 4, 2008

(51) Int. Cl.
*H01H 9/02* (2006.01)
*H02G 3/08* (2006.01)

(52) U.S. Cl. .................. 174/58; 174/481; 174/50; 174/53; 220/3.3; 220/4.02; 439/535

(58) Field of Classification Search ........... 174/480, 174/481, 50, 53, 57, 58, 66, 67, 64; 220/3.2–3.9, 220/4.02, 242, 241; 439/136, 142, 147, 535, 439/536; 248/906; 361/641
See application file for complete search history.

(56) References Cited

U.S. PATENT DOCUMENTS

| | | | |
|---|---|---|---|
| 3,564,112 A * | 2/1971 | Algotsson et al. ........... | 174/563 |
| 5,280,135 A | 1/1994 | Berlin et al. | |
| 5,763,831 A | 6/1998 | Shotey et al. | |
| 6,133,531 A | 10/2000 | Hayduke et al. | |
| 6,770,814 B2 | 8/2004 | Shotey et al. | |
| 6,891,104 B2 | 5/2005 | Dinh | |
| 6,930,251 B2 | 8/2005 | Shotey et al. | |
| 6,956,169 B1 | 10/2005 | Shotey et al. | |
| 6,956,171 B1 | 10/2005 | Gretz | |
| 6,965,078 B1 | 11/2005 | Gretz | |
| 6,987,225 B2 | 1/2006 | Shotey et al. | |
| 7,005,578 B2 | 2/2006 | Gretz | |
| 7,064,271 B1 | 6/2006 | Gretz | |
| 7,071,415 B1 | 7/2006 | Shotey et al. | |
| 7,115,820 B1 | 10/2006 | Gretz | |
| 7,151,219 B1 | 12/2006 | Gretz | |
| 7,166,801 B1 | 1/2007 | Gretz | |
| 7,235,740 B2 * | 6/2007 | Dinh ........................... | 174/67 |
| 7,396,997 B2 * | 7/2008 | Dinh ........................... | 174/67 |
| 7,439,444 B1 * | 10/2008 | Maltby et al. ................. | 174/66 |
| 7,462,777 B2 * | 12/2008 | Dinh ........................... | 174/58 |
| 7,476,806 B2 * | 1/2009 | Dinh ........................... | 174/58 |

* cited by examiner

*Primary Examiner*—Angel R Estrada
(74) *Attorney, Agent, or Firm*—Hoffmann & Baron, LLP

(57) ABSTRACT

A recessed electrical outlet box which includes a body that is selectably connected to a cover by either a first or a second hinge assembly. The body includes a back wall, a face plate, a side wall and an interior, wherein the side wall extends between the back wall and face plate and the face plate has an opening for accessing the interior. The interior includes a recessed pair of bosses and a pair of mounting holes, which can be used for mounting electrical devices in the interior. The first and second hinge assemblies have a first hinge axis and a second hinge axis, respectively, and are attached to the face plate and cover so that the first hinge axis is substantially perpendicular to the second hinge axis.

33 Claims, 7 Drawing Sheets

DUAL-HINGE RECESSED OUTDOOR BOX AND COVER

FIELD OF THE INVENTION

This invention pertains to a recessed outdoor electrical outlet box and cover, more particularly, to a dual-hinge recessed weatherproof outdoor electrical outlet box and cover that can be mounted in either a horizontal or vertical orientation.

BACKGROUND OF THE INVENTION

Recessed electrical boxes are not new to the art. Such boxes are designed to be mounted in an opening in a wall or other building structure so that the actual electrical device (duplex, GFCI, switch, data jack, co-axial cable connector, etc.) is recessed into the wall and is not flush with the surface of the wall as is normally the case.

Recessed electrical boxes of the type shown in U.S. Pat. No. 4,988,832 and U.S. Pat. No. 5,171,939 comprise multiple components in addition to the cover, which is hinged along a single side. The cover of the '832 patent includes a recess through which a cord can pass. U.S. Pat. No. 6,737,576 shows another recessed box, which includes slots in the cover that permit a wire or electrical cord to pass out of the box even when the cover is closed. While these and other recessed box designs are suitable for their intended purpose, they are all configured so that the cover can only open either along a horizontal axis or a vertical axis. They are not designed so that the user can select whether the cover is to open vertically or horizontally depending on the user's need. Thus, the installer of such boxes needs to maintain a supply of both horizontally opening and vertically opening boxes in inventory to ensure that the proper box is on hand at the job site.

Additionally, these recessed electrical boxes are generally constructed as single gang boxes, although double gang recessed boxes are also used. Consequently, once again, the installer needs to maintain a supply of both types (i.e., single and double gang boxes) in stock. Because of the numerous types of recessed electrical boxes, i.e. horizontal, vertical, single and double gang boxes, a user has to carry a large and diverse inventory of boxes at a substantial cost and utilization of storage space. This is particularly undesirable for a specialty box that is used in only a limited number of applications.

It is thus an object of this invention to provide a recessed electrical outlet box with a cover that can be opened either horizontally or vertically. Another object of this invention is to provide a box that can be employed as either a single-gang recessed box or a double-gang recessed box. Still another object of this invention is to provide a recessed electrical box that is weatherproof and which is configured to permit an electrical cord to pass out of the box even when the cover is in the closed position. These and other objects and advantages are provided by the recessed box of this invention as set forth in detail in the description and drawings.

SUMMARY OF THE INVENTION

The present invention relates to a recessed electrical outlet box which preferably includes a unitary body that is selectably connected to a cover by either a first or a second hinge assembly. The body includes a back wall, a face plate, a side wall and an interior, wherein the side wall extends between the back wall and face plate and the face plate has first and second hinge components and an opening for accessing the interior. The side wall can include a plurality of wall sections and, preferably, is substantially rectangular with at least four wall sections. The interior includes a pair of bosses, which are recessed from the face plate, and a pair of mounting holes, which defines a mounting axis. The pair of bosses and the pair of mounting holes can be used for mounting electrical devices in the interior. The first and second hinge components have a first hinge axis and a second hinge axis, respectively, and are attached to the face plate so that the first hinge axis is substantially perpendicular to the second hinge axis.

The cover is pivotally secured to either the first hinge component or the second hinge component and movable between an open position, which allows access to the interior, and a closed position, which prevents access to the interior. The cover has a first connector and a second connector, which can be connected to either the first hinge component or the second hinge component, respectively, in order to provide either vertical or horizontal opening of the cover. In one embodiment, the first hinge component and the second hinge component are located next to adjoining wall sections. When the first connector is connected to the first hinge component, a first hinge assembly is formed and, when the second connector is connected to the second hinge component, a second hinge assembly is formed. Preferably, the first and second connectors can be snapped into and out of the first and second hinge components so that the user can select the orientation (either vertical or horizontal) of the cover when the box is installed and easily change the orientation thereafter.

The body can also include a lip that extends outwardly from the face plate and around the opening to minimize the amount of water that can enter the box. Preferably, the dimensions of the lip and cover are selected so that, when the cover is in the closed position, it fits snugly over the lip. The face plate is substantially flat and extends between an outer perimeter and an inner perimeter that defines the opening to the interior of the body. The side wall extends between the inner perimeter and the back wall and in a preferred embodiment, the side wall extends uniformly beyond the face plate to form the lip. Alternatively, the face plate can be a flange recessed slightly (i.e., between about 0.05 and 0.75 inches) from the opening and extending outwardly from the sidewall. The face plate can also include a plurality of mounting screw apertures for attaching the electrical box to a structure, typically a wall structure. In addition, the body and/or cover can include a plurality of knockouts for forming wiring access ports.

The box can have a latching mechanism for releasably securing the cover to the body when the cover is in the closed position. The cover can have an electrical cord access port, which permits at least one electrical cord to extend out of the body when the cover is in the closed position. In addition, the lip can have at least one electrical cord access aperture, which permits an electrical cord to extend out of the body when the cover is in the closed position. In some embodiments, the location of the electrical cord access port(s) correspond(s) with the location of the electrical cord access aperture(s) when the cover is in the closed position so that electrical cords and/or wires can pass through both the electrical cord access port(s) and the electrical cord access aperture(s).

In one embodiment, the interior includes three pairs of bosses, which extend from the side wall and/or the back wall. A first pair of mounting holes, which defines a first mounting axis, is located in one of the pairs of bosses and is used for mounting an electrical device in the interior. The first mounting axis can be either substantially parallel to or substantially perpendicular to the first hinge axis. The two other pairs of bosses are be used for mounting two electrical devices in the box.

BRIEF DESCRIPTION OF THE DRAWINGS

The preferred embodiments of the dual-hinge, recessed, outdoor, electrical box and cover of the present invention, as well as other objects, features and advantages of this invention, will be apparent from the following detailed description, which is to be read in conjunction with the accompanying drawings wherein.

DETAILED DESCRIPTION OF PREFERRED EMBODIMENTS

Figure 1:
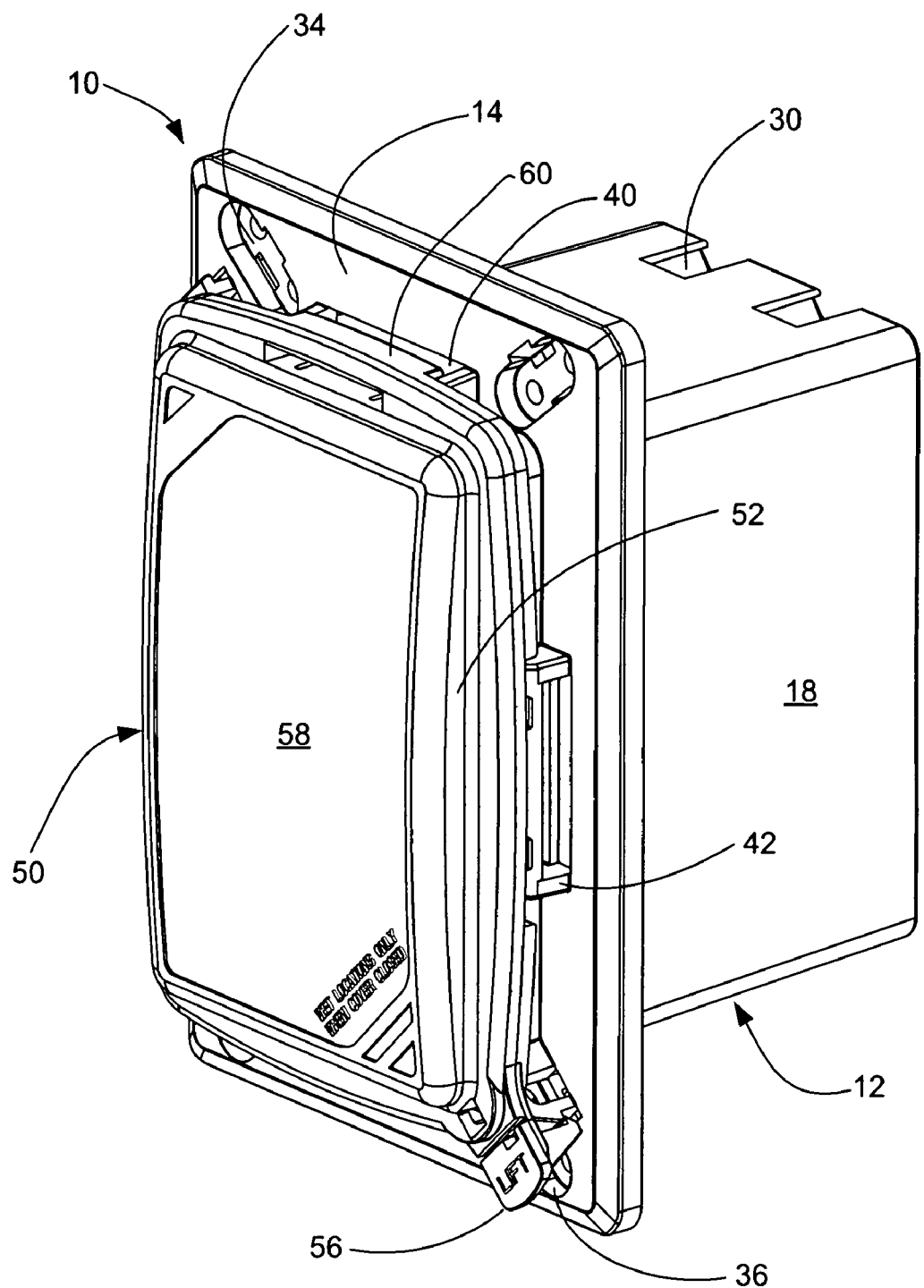
FIG. 1 is a front perspective view of a preferred embodiment of the dual-hinge outdoor box and cover with the cover closed and attached to the horizontally oriented hinge component.

This invention pertains to a recessed electrical outlet box having a body and a cover that can be attached to the body by a vertically or horizontally oriented hinge. The body is preferably of unitary construction and includes a back wall, a face plate, a side wall and an interior. The side wall extends between the back wall and the face plate and can include a plurality of wall sections, preferably at least four. The face plate has an opening that allows access to the interior of the body. The face plate has a substantially flat surface that extends outwardly from the opening and substantially perpendicular to the side wall, preferably in the shape of a flange and can also include a plurality of mounting screw apertures for attaching the electrical box to a structure, typically a wall structure. The side wall extends between the inner perimeter and the back wall. The interior of the body includes at least one pair of bosses recessed from the opening and having at least one pair of mounting holes, which define a mounting axis. The pair of bosses and the pair of mounting holes are used for mounting an electrical device in the interior.

At least two hinges components are attached to the face plate and each hinge has a hinge axis. As used herein, the term "hinge axis" is defined as an imaginary line through the longitudinal axis of the hinge around which the horizontal or vertical plane of the attached cover rotates when moving from the open to the closed position or vice versa. The hinge axes of the two hinge components are substantially perpendicular so that, when the cover is attached to one hinge component, it opens vertically and, when the cover is attached to the other hinge component, it opens horizontally relative to the orientation of the box mounted in a wall. Vertical opening of the cover is defined as pivotal movement of the cover along a vertically oriented hinge axis so that the side of the cover opposite the hinge component moves in either a left to right or right to left manner when the box is mounted in a wall with a vertical surface. Horizontal opening of the cover is defined as pivotal movement of the cover along a horizontally oriented hinge axis so that the side of the cover opposite the hinge component moves upwardly when the box is mounted in a wall with a vertical surface.

Any conventional hinge assembly for electrical outlet boxes can be used to pivotally connect the cover to the face plate and, typically, each of the two hinge assemblies has a hinge component attached to the face plate and a connector attached to the cover. Together, they form a hinge assembly. The hinge connector and the connector can be formed as a unitary structure with the body and cover, respectively (e.g., as a coextrusion). In a preferred hinge design, the hinge component is a clasp and the connector is a pin, which is pivotally engaged by the clasp. The pin snaps into the clasp and can rotate therein to open and close the cover. It is understood that the two components that make-up the hinge assembly are interchangeable so that, in one embodiment, the clasp is attached to the face plate and the connector is attached to the cover and, in another embodiment, the connector is attached to the face plate and the clasp is attached to the cover. Preferably, the hinge component and connector can be easily connected and disconnected by the user so that the cover can be attached to the face plate by either the vertically or horizontally oriented hinge assembly. Other hinge assembly designs that are well known to those skilled in the art can be used and the hinge assembly design selected is not a limitation of the invention.

The cover is pivotally secured to either the first hinge component or the second hinge component and is movable between an open position, which allows access to the interior, and a closed position, which prevents access to the interior. Each of the two hinge components has a longitudinal axis and, when the cover is connected to one of the hinge components, it pivots around the respective axis. Preferably, the two hinge components are located on adjacent sides of the opening in the body. The cover has first and second connectors which matingly engage the first and second hinge components, respectively. When the cover is oriented for either vertical or horizontal opening, one of the hinge components corresponds to one of the connectors to form either the first or second hinge assembly. In a preferred embodiment, the hinge components and connectors are configured so that both hinge assemblies cannot be engaged at the same time. To accomplish this, the hinge components and connectors are located on the face plate and cover so that when one of the hinge assemblies is connected, the unconnected hinge component and connector are on opposing sides of the box. This arrangement prevents the non-engaged hinge assembly from interfering with the closing of the cover.

The body can include a lip that extends outwardly from the face plate and around the opening to the interior. Alternatively, the box can be configured with a flange recessed from the opening and extending outwardly from the sidewall. When the cover is in the closed position, the lip minimizes the amount of water that can enter the box. The addition of a gasket on the cover or the top edge of the lip further reduces the amount of water that can enter the box. The body can have a plurality of knockouts for forming wiring access ports and the cover can have an electrical cord access port, which permits at least one electrical cord to extend out of the body when the cover is in the closed position. In addition, the lip can include at least one electrical cord access aperture, which permits an electrical cord to extend out of the body when the cover is in the closed position. In some embodiments, the location of the electrical cord access ports corresponds with the location of the electrical cord access apertures when the cover is in the closed position. This allows electrical cords and/or wires to pass through both the electrical cord access port and the electrical cord access aperture.

The box can include a latching mechanism for releasably securing the cover to the body when the cover is in the closed position. In a preferred design, the cover is substantially rectangular with the two hinge components on adjacent sides of the cover and the latching mechanism located on the corner formed by the two non-adjacent sides. In this configuration, when the box is installed in a vertical wall structure, the latching mechanism is located at the bottom of the cover, whether the cover opens vertically or horizontally. Any conventional latching mechanism suitable for electrical outlet boxes can be used. These latching mechanisms typically include a catch and a latch.

The pair of bosses are recessed from the face plate so that a plug (or some other type of connecting device) can be connected to an electrical device mounted on the bosses and the cover can still be closed. The front of the bosses (i.e., the surface parallel to and closest to the face plate) can extend to about the midpoint between the back wall and face plate. However, the location of the front of the bosses can vary to accommodate different types of electrical devices. Preferably, the front of the bosses is located in the middle third of the distance between the back wall and the face plate. In another embodiment, the interior includes more than one pair of bosses, which extend from the side wall and/or the back wall. A first pair of mounting holes, which defines a first mounting axis, is located in one of the pairs of bosses and is used for mounting an electrical device in the interior. The first mounting axis can be either substantially parallel to or substantially perpendicular to the first hinge axis. The other pairs of bosses can be used for mounting two electrical devices in the box. As used herein, the term "electrical device" includes, but is not limited to any electrical device that can be mounted in an electrical box, such as a duplex receptacle, a GFCI, a switch, a data jack, or a co-axial cable connector. Preferably, the mounting axes for each of the three pairs of mounting holes are parallel to each other. When the outlet box is vertically oriented, the mounting axes are in the vertical direction. Rotating the outlet box by 90 degrees orients the outlet box and the mounting axes in the horizontal direction.

In a preferred embodiment, the face plate and cover of the recessed electrical outlet box are substantially rectangular. The user can position the box in a wall so that the longitudinal or lengthwise axis of the box is vertically oriented. In this orientation, the first hinge assembly on the top of the opening in the box can be connected to provide horizontal opening of the cover or the second hinge assembly on the side of the opening can be connected to provide vertical opening of the cover. Similarly, if the box is positioned in a wall so that the latitudinal or widthwise axis of the box is vertically oriented, the first hinge assembly, which is now on the side of the opening in the box, is connected to provide vertical opening of the cover or the second hinge assembly, which is now on the top of the opening, is connected to provide horizontal opening of the cover. After the user determines how the recessed outlet box will be oriented in a wall, the user can decide how the cover will open, either vertically or horizontally. The hinge assemblies are easily separable so that the user can disconnect the first hinge assembly and snap the second hinge assembly together. This allows the user to change the orientation of the cover opening even after the box is installed in a wall.

After an electrical device (e.g. an electrical receptacle) is installed in the interior of the body, a cover plate can be placed over the electrical device to minimize the amount of dirt, dust or moisture that can contact the rear of the electrical device and the wiring connections. The cover plate has an opening in the central portion that fits over the electrical device and a pair of mounting screw apertures that correspond to a pair of mounting apertures in the pair of bosses. After the cover plate is installed over the electrical device, a pair of mounting screws are inserted through the mounting screw apertures and the mounting apertures in the bosses and tightened to secure the cover plate in the interior of the body. Typically, the front of the electrical device and cover plate are recessed from the face plate so that a plug or jack can be connected to the electrical device without interfering with the closing of the cover. In some embodiments, an adapter plate is installed between the electrical device and the cover plate to further seal the space behind the cover plate and the electrical device. The adapter plate can have one or more mounting screw openings which are used to attach the adapter plate to the electrical device.

The interior of the body can have a plurality of ribs that extend into the interior from the side walls. The front of the ribs (i.e., the portion of the rib that is closest to the face plate) is approximately the same distance from the back wall as the top of the bosses. Preferably, the ribs extend from the back wall to about the top of the bosses. However, in some embodiments, the ribs can be studs or tabs that extend from the side walls. When the cover plate is secured to the bosses, the front of the ribs contact and support the perimeter of the cover plate. Alternatively, an interior ledge can be formed by a thinning of the sidewall where the front of the ribs would have been located. In this embodiment, the cover plate rests on/against this ledge after being secured to the box.

The body of the recessed electrical outlet box can have a variety of different shapes, such as round, rectangular, pentagonal, hexagonal, heptagonal or octagonal, but a rectangular shape is preferred because it is easier to install and offers the maximum flexibility for orienting the outlet box and the fixtures inside the box. The front of the box preferably has a face plate in the form of a flange, which extends between the side wall at the inner perimeter and the outer perimeter. When the outlet box is installed, the wall cutout or opening is sized so that the side wall of the body can pass through the opening but the face plate prevents the front of the outlet box from passing through the opening. The bottom surface of the face plate contacts the wall surface and the mounting screws are inserted into the mounting screw apertures in the face plate to secure the outlet box to the wall.

Referring to the drawings, FIG. 1 shows a preferred embodiment of the dual-hinge outdoor box cover 10, which includes a body 12 and hinged cover 50. The box 10 is positioned with its longitudinal axis vertically oriented and configured so that the first hinge assembly 40, 60 opens the cover 50 horizontally.

Figure 2:
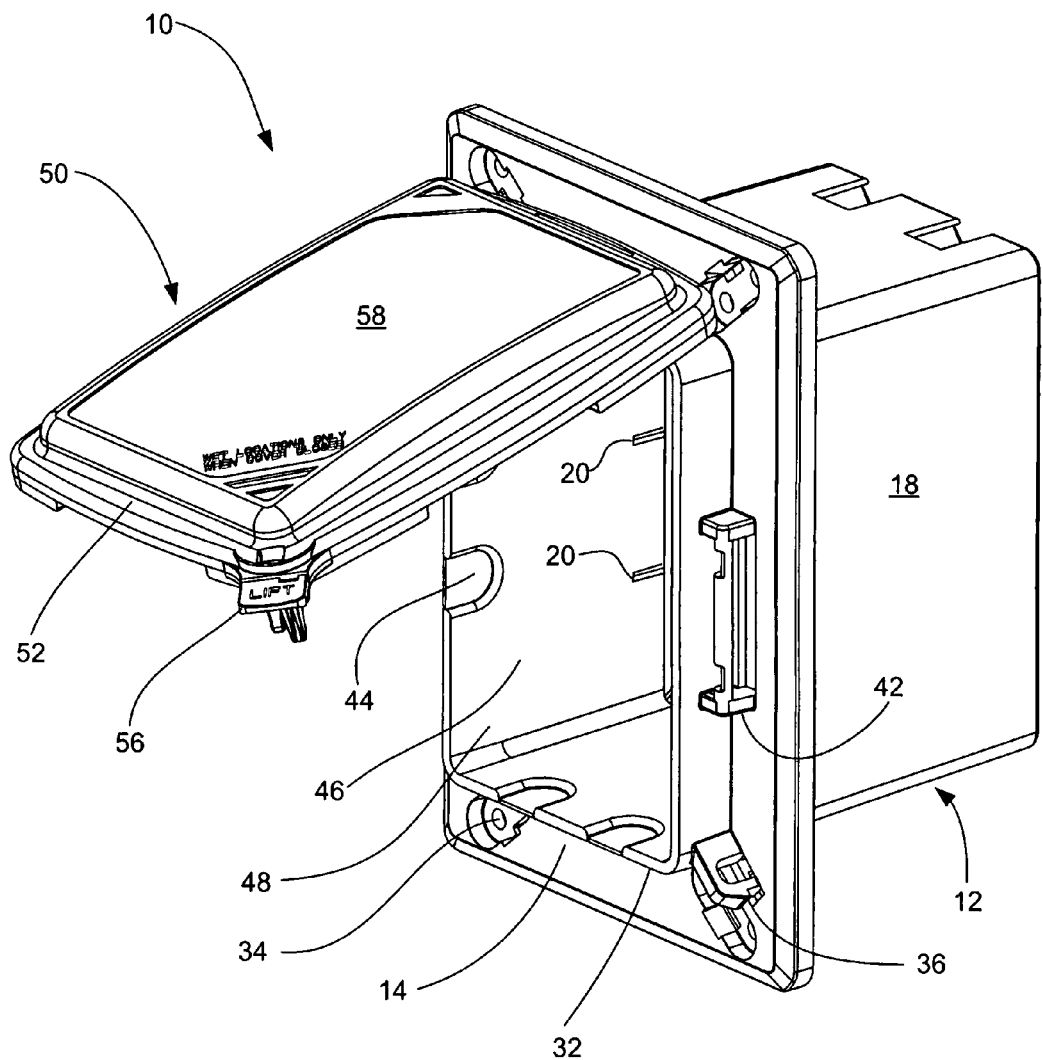
FIG. 2 is a front perspective view of a preferred embodiment of the dual-hinge outdoor box and cover with the cover open and attached to the horizontally oriented hinge component.
Figure 3:
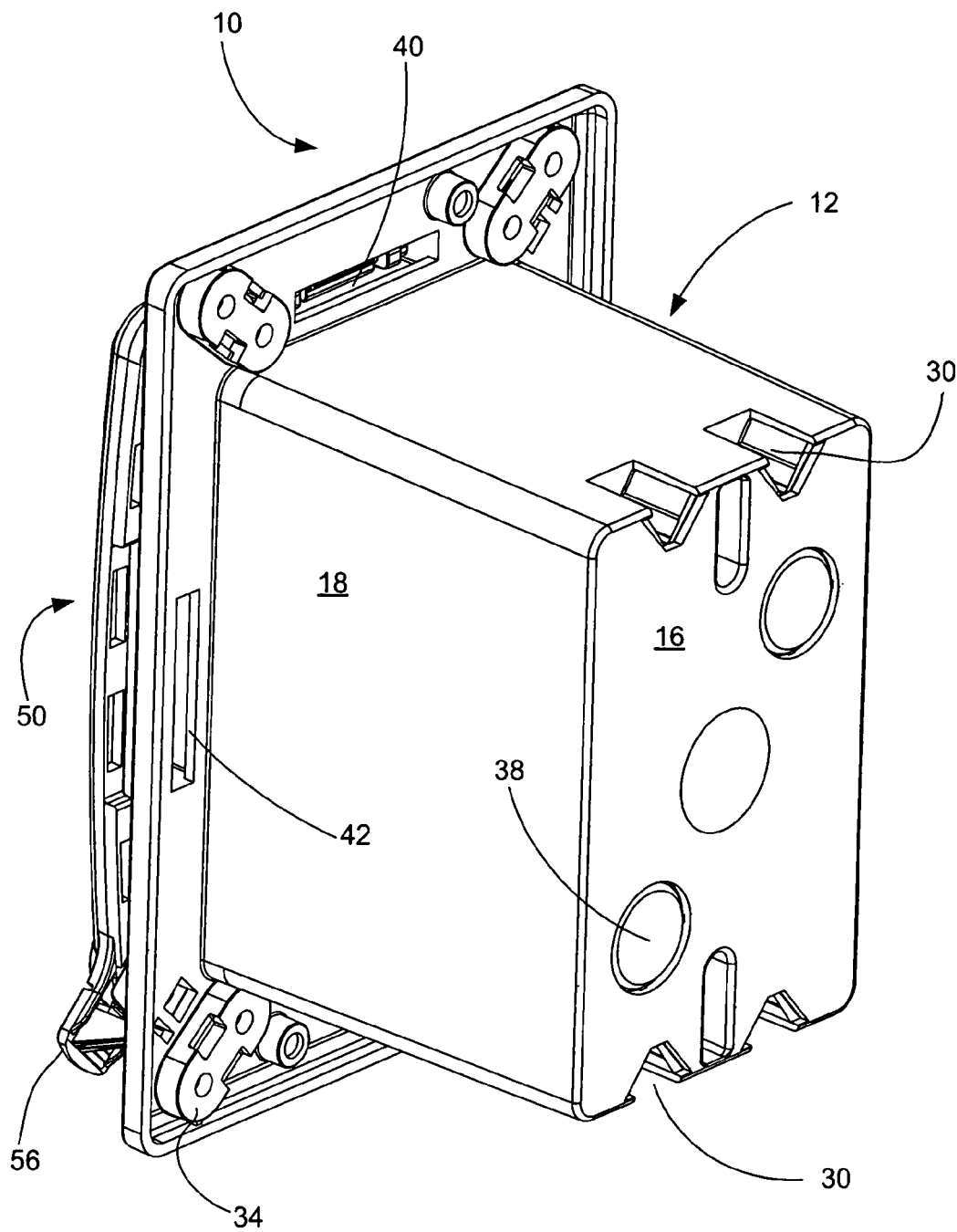
FIG. 3 is a rear perspective view of a preferred embodiment of the dual-hinge outdoor box and cover with the cover closed and attached to the horizontally oriented hinge component.

The body 12 includes a face plate 14, a side wall 18 and a back wall 16 (see FIG. 3). The face plate 14 has mounting screw apertures 34 for attaching the box 10 to a structure (not shown) and two hinge components 40, 42 mounted on adjoining sides of the opening 46 in the face plate 14 (see FIG. 2). One of the hinge components 42 on the face plate 14 is located along the lengthwise side of the opening 46 and is parallel to the longitudinal axis of the body 12. The other hinge component 40 is located along the widthwise side of the opening 46 and is parallel to the latitudinal axis of the body. Thus, the two hinge components are substantially perpendicular to each other.

Figure 4:
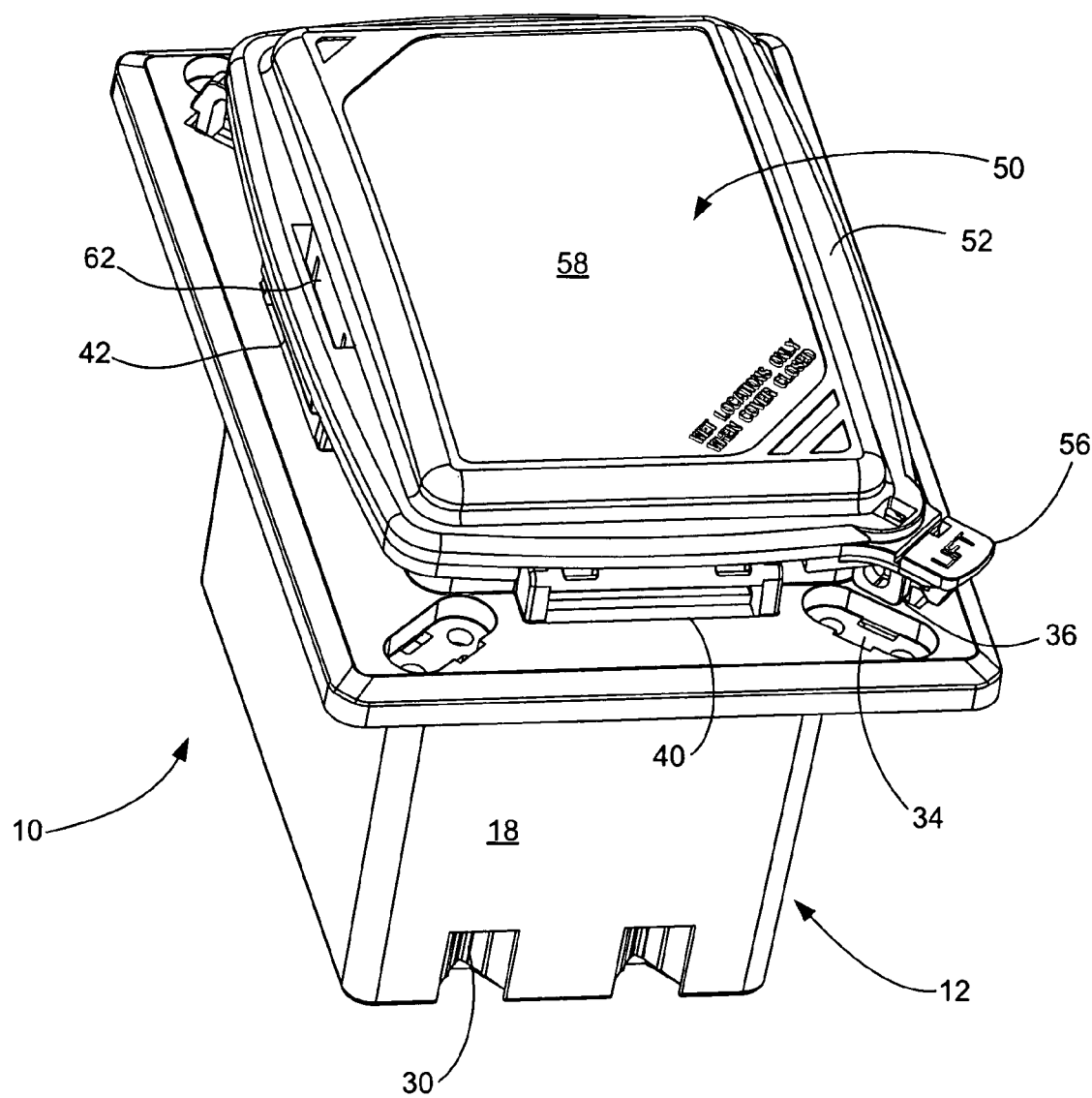
FIG. 4 is a front perspective view of a preferred embodiment of the dual-hinge outdoor box cover with the cover closed and attached to the vertically oriented hinge component.

The cover 50 has two connectors 60, 62, which matingly correspond to the hinge components 40, 42 on the face plate 14. The cover connectors 60, 62 are located along the widthwise side (connector 60) and the lengthwise side (connector 62) of the cover 50. The widthwise hinge component 40 corresponds to the widthwise connector 60 to form a first hinge assembly 40, 60 (FIG. 1) and the lengthwise hinge component 42 corresponds to the lengthwise hinge connector 62 to form a second hinge assembly 42, 62 (FIG. 4).

FIG. 1 also shows the body 12 of the box 10 with the side wall 18 extending from the face plate 14 to the back wall 16 (FIG. 3). One or more cable entry ports 30 can be provided in the body 12 for passing cables or wires into or out of the body 12. The mounting screw apertures 34 are recessed in the face plate 14 and after the box 10 is attached to a wall, inserts or filler plates can be placed in the recessed mounting screw openings.

FIG. 2 shows the recessed outlet box 10 with the longitudinal/lengthwise axis vertically oriented and with the cover 50 configured for horizontal opening and in the open position. The face plate 14 has an opening 48 that is bounded by a lip 32 that extends outwardly, away from the face plate 14. This lip is in alignment with the sidewall and hence it can be said that face plate 14 forms a flange extending outwardly from sidewall 18. In preferred embodiments, the lip 32 can be used in combination with a gasket (not shown) on the cover 50 to provide a water-resistant seal around the edge of the opening 48. A plurality of cord access ports 44 in the lip 32 are provided so that electrical cords and/or wires (not shown) can pass into and out of the interior 46 when the cover 50 is in the closed position. The cord access ports 44 preferably have knockouts, which the user removes as needed for specific applications. Such knockouts are well known to those skilled in the art. When the box 10 is of one-piece construction made of a plastic material and uniformly formed using a molding process, the knockouts are typically thinner than the other portions of the lip 32 and they can be cut out or poked out with a utility knife or screwdriver to form the cord access ports 44. If the knockouts are left in place, they help to prevent water from entering the box 10. When the box 10 is mounted to a structure, the cover 50 is oriented so that the electrical cord access ports 54 face downwardly or to the side. This minimizes the amount of water that can enter the box 10 through the electrical cord access ports 54.

Figure 7:
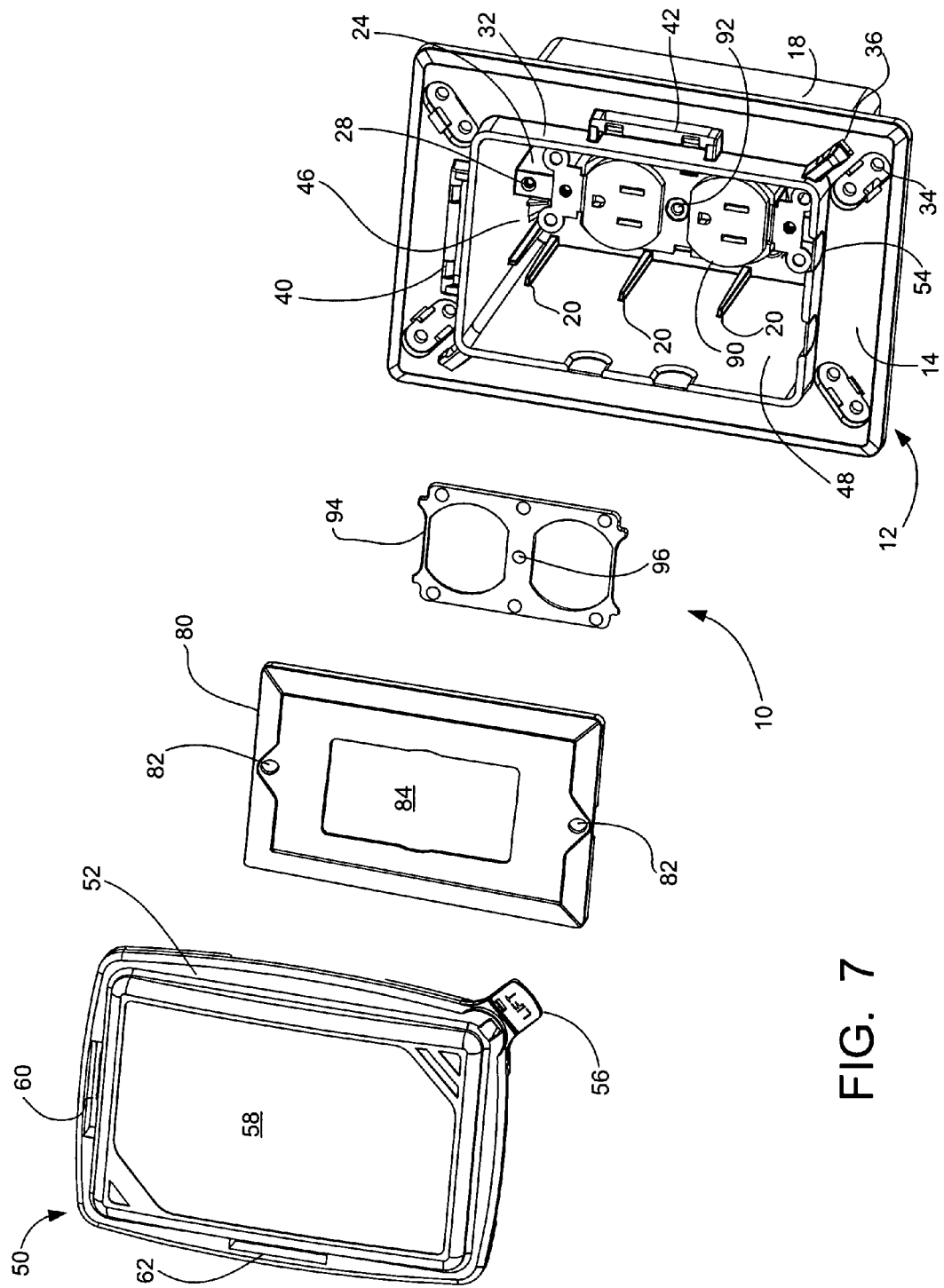
FIG. 7 is an exploded, front view of a preferred embodiment of the dual-hinge outdoor box and cover with an electrical receptacle mounted inside the box.

FIG. 2 also shows the interior 46 of the body 12, which includes a plurality of ribs 20 extending from the side wall 18. These ribs 20 support a cover plate 80 that is installed in the body 12 after an electrical device 90 is secured in the interior 46 (FIG. 7). In other embodiments, the ribs 20 can be replaced by tabs that extend outwardly from the side wall 18 or by a ledge created by a thinning of the upper portion of sidewall 18.

Figure 6:
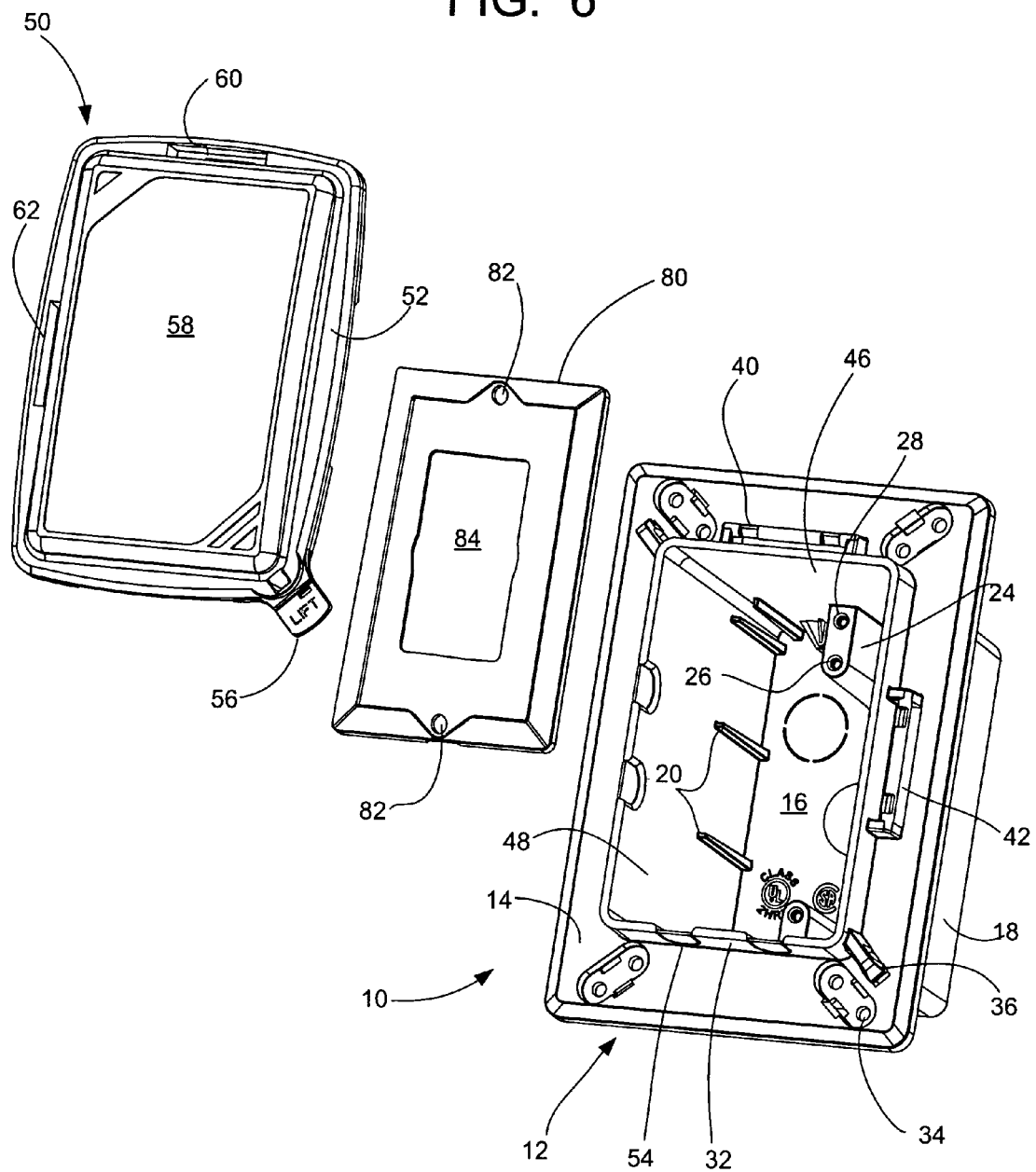
FIG. 6 is an exploded, front view of a preferred embodiment of the dual-hinge outdoor box and cover.

FIG. 2 shows hinge component 42 attached to the face plate 14 between the lip 32 and the outer perimeter of the face plate 14. In the cover configuration shown in FIG. 2, the lengthwise hinge component 42 is not connected to the cover 50. Accordingly, the location of the cover lengthwise connector 62 (see FIG. 6) does not correspond to the face plate lengthwise hinge component 42. Instead, the connector 62 is located on the opposite of the cover 50 (FIG. 6). This allows the cover 50 to open and close using the hinge assembly 40, 60 (FIG. 1) on the top of the opening 48 without interference.

The face plate 14 also includes a pair of latching devices 36 located at diagonally opposing corners of the face plate 14. The cover 50 has a catch 56 located on one of the corners; preferably, the corner formed by the two sides of the cover 50 that do not have a connector. This assures that the catch 56 is at the bottom of the cover 50 when the box 10 is mounted in a wall. The catch 56 engages one of the latching devices 36 when the cover 50 is connected to the face plate 14 with the first hinge assembly 40, 60 and the other latching device 36 is used when the cover 50 is connected to the face plate 14 with the second hinge assembly 42, 62. The latching device 36 and catch 56 in combination form a latching assembly 36, 56, which can be selected from any conventional latching assembly used for electrical outlet boxes and the invention is not limited by the design of the latching assembly.

The cover 50 in FIG. 2 is substantially rectangular in shape and includes a front wall 58 and a side wall 52, which fits snugly around the lip 32 after the cover 50 is closed. This limits the amount of water that can enter into the box 10 when the box 10 is installed outdoors or in a high moisture environment.

In FIG. 3, an embodiment of the dual-hinge outdoor box 10 is shown with the cover 50 attached to the face plate 14 using the first hinge assembly 40, 60 so that the cover 50 is oriented to open horizontally. The back wall 16 includes one or more knock-outs 38 and one or more cable and/or wiring ports 30 for running wires/cables to devices (FIG. 7) in the box 10. The locking mechanism 56 extends from one corner of the cover 50 and, when the cover 50 is in the closed position, the locking mechanism 56 engages one of the two latching devices 36 (FIG. 2) to secure the cover 50 to the face plate 14.

FIG. 4 shows a preferred embodiment of the dual-hinge outdoor box 10 with the cover 50 connected to the face plate 14 using the second hinge assembly 42, 62 so that the cover 50 opens vertically. In this configuration, the widthwise hinge component 40 is located at the bottom of the face plate 14. The catch 56 is at the bottom of the cover 50 and engages the latching mechanism 36 to secure the cover 50 in the closed position.

Figure 5:
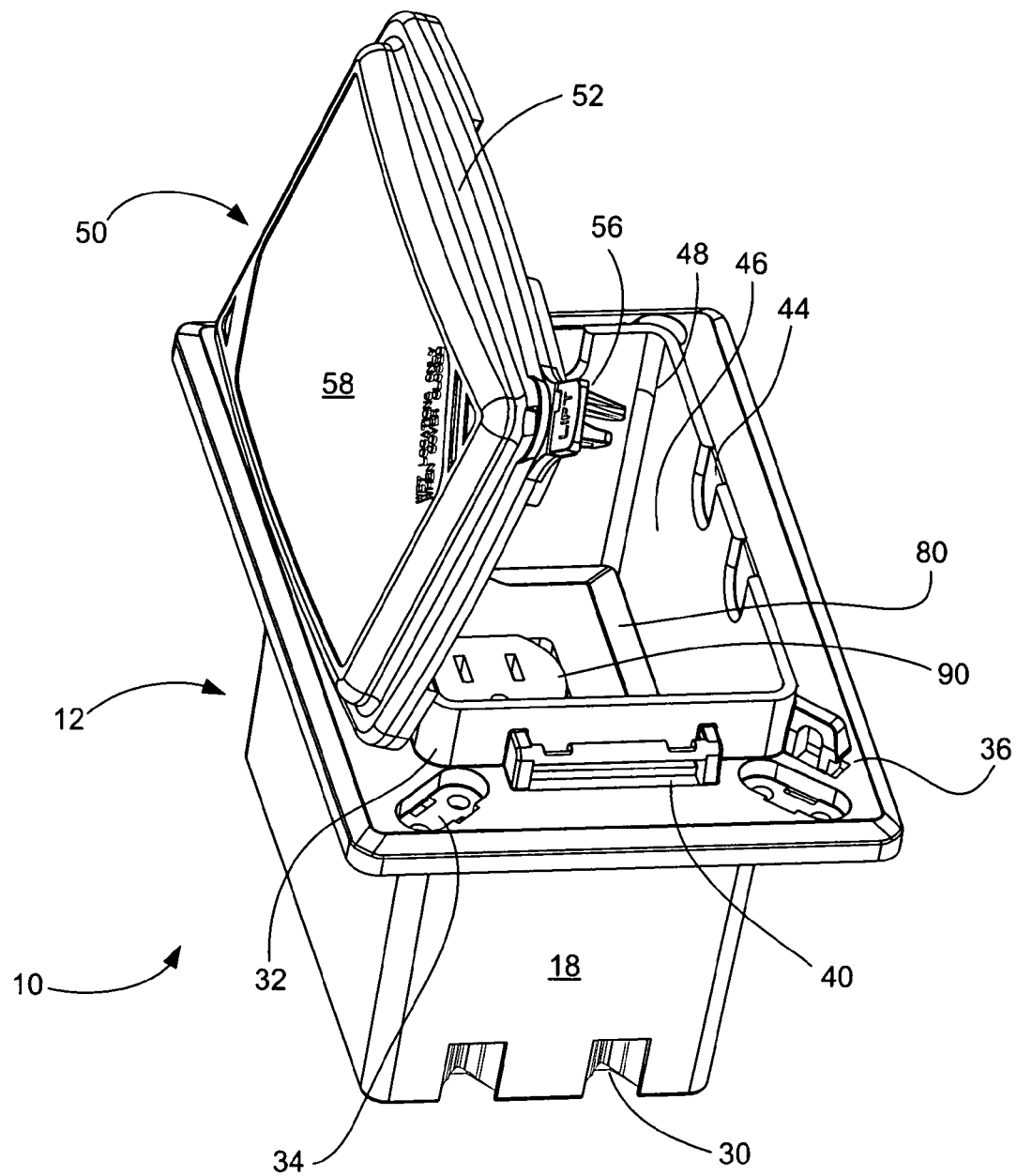
FIG. 5 is a front perspective view of a preferred embodiment of the dual-hinge outdoor box cover with the cover open and attached to the vertically oriented hinge component.

FIG. 5 shows the dual-hinge outdoor box 10 of FIG. 4 with the cover 50 in the open position. An electrical receptacle 90 is mounted in the body 12 and a cover plate 80 is placed over the receptacle 90 and attached to the mounting holes 28 in the pair of bosses 24 (FIG. 7). The receptacle 90 is recessed in the body 12 so that when the plug of an electrical power cord (not shown) is connected to the receptacle 90, the plug will not prevent the cover 50 from being closed and secured in place by the latching assembly 36, 56.

FIG. 6 shows an exploded view of the dual-hinge outdoor box 10 with cover 50 and cover plate 80. The interior 46 has a pair of bosses 24 with a pair of mounting holes 26 for mounting an electric device or fixture 90 (FIG. 7). The cover plate 80 has an opening 84 that fits over the electrical device 90 and a pair of mounting screw apertures 82, which align with a second set of mounting holes 28 on the pair of bosses 24 and which are used to secure the cover plate 80 to the interior 46 of the body 12. A plurality of ribs 20 extend from the side wall 18 on the interior 46 of the body 12 and provide support for the face plate 80.

FIG. 7 is an exploded view of the dual-hinge outdoor box 10 with cover 50, adapter plate 94 and cover plate 80. An electrical receptacle 90 is mounted in the interior 46 and secured by mounting screws to the pair of bosses 24 using the first pair of mounting holes 26. The receptacle 90 has a mounting aperture 92 in the center, which is used to attach the adapter plate 94. After the adapter plate 94 is attached, the cover plate 80 is secured to the pair of bosses 24 using the second set of mounting holes 28.

While select preferred embodiments of this invention have been illustrated, many modifications may occur to those skilled in the art and therefore it is to be understood that these modifications are incorporated within these embodiments as fully as if they were fully illustrated and described herein.

We claim:

1. A recessed electrical outlet box comprising:
 a body having a back wall, a face plate, a side wall and an interior, wherein the side wall extends from the back wall to the face plate, and wherein the face plate has an opening for accessing the interior;
 a first hinge component and a second hinge component attached to the face plate, wherein the first hinge component has a first hinge axis and the second hinge component has a second hinge axis, wherein the first hinge axis is substantially perpendicular to the second hinge axis;
 a cover selectably connected to either the first hinge component or the second hinge component and movable between an open position, which allows access to the interior, and a closed position, which prevents access to the interior;
 a pair of bosses in the interior, wherein the bosses are recessed from the face plate; and
 a pair of mounting holes in the pair of bosses for mounting an electrical device in the interior.

2. The recessed electrical outlet box as set forth in claim 1, wherein the side wall is comprised of one or more wall sections.

3. The recessed electrical outlet box as set forth in claim 2, wherein the side wall is substantially rectangular and has at least four wall sections.

4. The recessed electrical outlet box as set forth in claim 3, wherein the first hinge and the second hinge are located next to adjoining wall sections.

5. The recessed electrical outlet box as set forth in claim 1, wherein the cover has a first connector and a second connector, and wherein either the first connector is connected to the first hinge component to form a first hinge assembly or the second connector is connected to the second hinge component to form a second hinge assembly.

6. The recessed electrical outlet box as set forth in claim 1, wherein the body further comprises a lip that extends outwardly from the face plate and around the opening.

7. The recessed electrical outlet box as set forth in claim 6, wherein the lip comprises at least one electrical cord access aperture, wherein the at least one electrical cord access aperture permits an electrical cord to extend out of the body when the cover is in the closed position.

8. The recessed electrical outlet box as set forth in claim 1, wherein the face plate comprises a plurality of mounting screw apertures.

9. The recessed electrical outlet box as set forth in claim 1, wherein the body comprises a plurality of knockouts for forming wire access ports.

10. The recessed electrical outlet box as set forth in claim 1, wherein a plurality of ribs extend from the side wall into the interior.

11. The recessed electrical outlet box as set forth in claim 1, further comprising:
 a cover plate having an opening and a pair of attachment apertures; and
 a pair of mounting apertures in the pair of bosses,
 wherein the pair of attachment apertures and the pair of mounting apertures are used for attaching the cover to the pair of bosses.

12. The recessed electrical outlet box as set forth in claim 11, wherein a plurality of ribs having a front end and a rear end extend from the side wall into the interior, and wherein the cover plate contacts the front end of the plurality of ribs when attached to the pair of bosses.

13. The recessed electrical outlet box as set forth in claim 1, wherein the cover comprises an electrical cord access port, wherein the electrical cord access port permits at least one electrical cord to extend out of the body when the cover is in the closed position.

14. The recessed electrical outlet box as set forth in claim 1, further comprising a latching mechanism for releasably securing the cover to the body when in the closed position.

15. The recessed electrical outlet box according to claim 1, wherein the pair of bosses extend from the back wall and/or the side wall.

16. The recessed electrical outlet box according to claim 1, wherein the face plate is substantially flat and extends between an outer perimeter and an inner perimeter that defines the opening, and wherein the side wall extends between the inner perimeter and the back wall.

17. The recessed electrical outlet box according to claim 1, wherein the interior comprises a first, a second and a third pair of bosses and a first, a second pair and a third pair of mounting holes, wherein the first, the second and the third pairs of mounting holes are in the first, the second and the third pairs of bosses, respectively, and wherein the first pair of mounting holes is used to mount a single electrical device in the box and the second and third pairs of mounting holes are used to mount two devices in the box.

18. A recessed electrical outlet box comprising:
 a body having a back wall, a face plate, a side wall and an interior, wherein the face plate has an opening for accessing the interior;
 a first hinge component and a second hinge component attached to the face plate, wherein the first hinge component has a first hinge axis and the second hinge component has a second hinge axis;
 a cover comprising latching mechanism, a first connector and a second connector, wherein either the first connector is connected to the first hinge component to form a first hinge assembly or the second connector is connected to the second hinge component to form a second hinge assembly, wherein the cover is selectably connected to the face plate by either the first hinge assembly or the second hinge assembly and releasably secured to the face plate by the latching mechanism, and wherein the cover is movable between an open position, which allows access to the interior, and a closed position, which prevents access to the interior;
 one or more pairs of bosses in the interior, wherein the bosses are recessed from the face plate; and
 a first pair of mounting holes in the one or more pairs of bosses for mounting an electrical device in the interior, wherein the first pair of mounting holes defines a first mounting axis.

19. The recessed electrical outlet box as set forth in claim 18, wherein the first hinge axis is substantially perpendicular to the second hinge axis.

20. The recessed electrical outlet box as set forth in claim 18, wherein the pair of bosses are recessed from the face plate to a point from about one-third to about two-thirds the distance between the face plate and the back wall.

21. The recessed electrical outlet box as set forth in claim 18, wherein the side wall is comprised of one or more side wall sections.

22. The recessed electrical outlet box as set forth in claim 19, wherein the side wall is substantially rectangular and has at least four side wall sections.

23. The recessed electrical outlet box as set forth in claim 18, wherein the first mounting axis is substantially parallel to or substantially perpendicular to the first hinge axis.

24. The recessed electrical outlet box as set forth in claim 18, wherein the body further comprises a lip that extends outwardly from the face plate and around the opening.

25. The recessed electrical outlet box as set forth in claim 24, wherein the lip comprises at least one electrical cord access aperture, wherein the at least one electrical cord access aperture permits an electrical cord to extend out of the body when the cover is in the closed position.

26. The recessed electrical outlet box as set forth in claim 18, wherein the cover comprises an electrical cord access port, wherein the electrical cord access port permits at least one electrical cord to extend out of the body when the cover is in the closed position.

27. The recessed electrical outlet box as set forth in claim 18, wherein the body comprises a plurality of knockouts for forming one or more wire access ports.

28. The recessed electrical outlet box as set forth in claim 18, wherein the face plate comprises a plurality of mounting screw apertures.

29. The recessed electrical outlet box according to claim 18, wherein the one or more pairs of bosses extend from the back wall and/or the side wall.

30. A recessed electrical outlet box comprising:
   a body having a back wall, a face plate, a side wall, a lip, an interior and a plurality of ribs extending from the side wall into the interior, wherein the face plate has an opening for accessing the interior, and wherein the lip extends outwardly from the face plate and around the opening;
   a first hinge component and a second hinge component attached to the face plate, wherein the first hinge component has a first hinge axis and the second hinge component has a second hinge axis, and wherein the first hinge axis is substantially perpendicular to the second hinge axis;
   a cover comprising latching mechanism, a first connector and a second connector, wherein either the first connector is connected to the first hinge component to form a first hinge assembly or the second connector is connected to the second hinge component to form a second hinge assembly, wherein the cover is selectably connected to the face plate by either the first hinge assembly or the second hinge assembly and releasably secured to the face plate by the latching mechanism, and wherein the cover is movable between an open position, which allows access to the interior, and a closed position, which prevents access to the interior;
   one or more pairs of bosses in the interior, wherein the bosses are recessed from the face plate; and
   a first pair of mounting holes in the one or more pairs of bosses for mounting an electrical device in the interior.

31. The recessed electrical outlet box as set forth in claim 30, wherein the lip comprises at least one electrical cord access aperture, wherein the at least one electrical cord access aperture permits an electrical cord to extend out of the body when the cover is in the closed position.

32. The recessed electrical outlet box as set forth in claim 30, further comprising:
   a cover plate having an opening and a pair of attachment apertures; and
   a pair of mounting apertures in the pair of bosses,
   wherein the pair of attachment apertures and the pair of mounting apertures are used for attaching the cover to the pair of bosses, and wherein the cover plate is supported by the pair of ribs.

33. The recessed electrical outlet box as set forth in claim 30, wherein the cover comprises an electrical cord access port or the lip comprises an electrical cord access aperture, and wherein the electrical cord access port or the electrical cord access aperture permits at least one electrical cord to extend out of the body when the cover is in the closed position.

* * * * *